United States Patent [19]

Hishinuma et al.

[11] Patent Number: 4,564,861
[45] Date of Patent: Jan. 14, 1986

[54] SUBTRACTION PROCESSING METHOD AND APPARATUS FOR RADIATION IMAGES

[75] Inventors: Kazuhiro Hishinuma; Akihiro Ohga, both of Kanagawa, Japan

[73] Assignee: Fuji Photo Film Co., Ltd., Kanagawa, Japan

[21] Appl. No.: 507,248

[22] Filed: Jun. 23, 1983

[30] Foreign Application Priority Data

Aug. 17, 1982 [JP] Japan .................................. 57-142499

[51] Int. Cl.$^4$ ............................................. H04N 5/32
[52] U.S. Cl. ..................................... 358/111; 378/162; 358/294
[58] Field of Search ......................... 250/327.2, 483.1; 378/162, 163, 164, 77; 358/111, 256, 294; 382/22

[56] References Cited

U.S. PATENT DOCUMENTS

| | | | |
|---|---|---|---|
| 3,515,870 | 6/1970 | Marquis | 378/163 |
| 3,909,616 | 9/1978 | Redfield et al. | 378/162 |
| 4,091,394 | 5/1978 | Kashioka et al. | 382/22 |
| 4,183,013 | 1/1980 | Agrawala et al. | 382/22 |
| 4,238,780 | 12/1980 | Doemens | 382/22 |

*Primary Examiner*—Edward L. Coles, Sr.
*Attorney, Agent, or Firm*—Sughrue, Mion, Zinn, Macpeak & Seas

[57] ABSTRACT

Markers having a shape defining an edge portion of a radiation image area are recorded together with radiation images in stimulable phosphor sheets in a position fixed with respect to the radiation images. The stimulable phosphor sheets are scanned with stimulating rays, and the edge portion defined by the markers is photoelectrically detected. Read-out of the image signals of the radiation images is conducted by using the detected signal of the edge portion as the read-out synchronizing signal, thereby to obtain the image signals corrected for deviations in position among the radiation images.

10 Claims, 11 Drawing Figures

SUBTRACTION PROCESSING METHOD AND APPARATUS FOR RADIATION IMAGES

BACKGROUND OF THE INVENTION

1. Field of the Invention

This invention relates to a subtraction processing method for radiation images and an apparatus for carrying out the method. More particularly to a subtraction processing method in a radiation image recording and reproducing method comprising the steps of exposing the stimulable phosphor sheet carrying a radiation image stored therein to stimulating rays to sequentially release the radiation energy stored in the stimulable phosphor sheet as light emission, photoelectrically reading out the emitted light by use of a photodetector, and reproducing the obtained image signal as a visible image, and an apparatus for carrying out the method.

2. Description of the Prior Art

When certain kinds of phosphors are exposed to a radiation such as X-rays, $\alpha$-rays, $\beta$-rays, $\gamma$-rays or ultraviolet rays, they store a part of the energy of the radiation. Then, when the phosphor which has been exposed to the radiation is exposed to stimulating rays such as visible light, light is emitted from the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and read-out system. Specifically, the stimulable phosphor formed on a sheet is first exposed to a radiation transmitting through an object to have a radiation image stored therein, and is then scanned with stimulating rays such as laser beam which causes it to emit light in the pattern of the stored image. The light emitted from the stimulable phosphor sheet upon stimulation thereof is photoelectrically detected and converted to an electric image signal, which is processed as desired to reproduce a visible image on a recording medium such as photographic lightsensitive material or on a display such as cathode ray tube (CRT).

This radiation image system using the stimulable phosphor sheet is advantageous over the conventional radiography using a silver halide photographic material in that the image can be recorded over a very wide range (latitude) of radiation exposure and further in that the electric signal used for reproducing the visible image can be freely processed to improve the image quality for viewing, particularly diagnostic purposes. In more detail, since the amount of light emitted upon stimulation after the radiation energy is stored in the phosphor varies over a very wide range in proportion to the amount of energy stored therein, it is possible to obtain an image having desirable density regardless of the amount of exposure of the phosphor to the radiation by reading out the emitted light with an appropriate read-out gain and converting it to an electric signal to reproduce a visible image on a recording medium or a display. The electric signal may further be processed as desired to obtain a radiation image suitable for viewing, particularly diagnostic purposes. This is very advantageous in practical use.

As mentioned above, in the radiation image system using a stimulable phosphor, deviation of the level of the radiation energy stored in the stimulable phosphor from a desired level can easily be compensated by setting the read-out gain to an appropriate value when photoelectrically reading out the light emitted from the stimulable phosphor upon stimulation thereof. Therefore, the quality of the reproduced radiation image is not adversely affected by a change in radiation dose due to fluctuating tube voltage or MAS value of the radiation source, a variation in the sensitivity of the stimulable phosphor or the photodetector, a change in radiation dose according to the condition of the object, or a change in the radiation transmittance according to the object etc. Further, it is possible to obtain a desirable radiation image even when the radiation dose to the object is reduced. Further, it is possible to obtain a radiation image having high image quality of high contrast, high sharpness and low noise etc. by once converting the light emitted from the stimulable phosphor into an electric signal, and processing the electric signal as desired. Particularly, when the radiation image is used for medical diagnosis, it is possible to obtain a radiation image processed in accordance with a desired portion of a human body such as the heart, the chest etc. and improve the diagnostic efficiency and accuracy.

There has heretofore been known a subtraction processing method wherein an image of a specific structure (for example, an organ, the bone, the blood vessel, or the like) of human body is extracted by use of two or more X-ray photographic films to correctly diagnose the specific structure. In general, the known subtraction processing method is classified into the so-called temporal (time difference) subtraction processing method and the so-called energy subtraction processing method. In the former method, an image of a specific structure is extracted by subtracting the digital image signal of an X-ray image obtained without injection of contrast media from the digital image signal of an X-ray image in which the image of the specific structure is enhanced by the injection of contrast media. In the latter method, an object is exposed to X-rays having energy distributions different from each other to obtain two X-ray images respectively containing the images of a specific structure recorded on the basis of the intrinsic X-ray energy absorption characteristics of the specific structure. Then, each X-ray image is weighted appropriately, and subjected to subtraction to extract the image of the specific structure.

However, the aforesaid subtraction processing method using the X-ray photographic films is disadvantageous in that, since the X-ray photographic films generally exhibit non-linear gradation and a narrow latitude of exposure, it is impossible to obtain a subtraction image of high quality. Further, in this conventional subtraction processing method using the X-ray photographic films, one X-ray image is inverted, two X-ray photographic films are manually superposed one upon the other, and the subtracted image is recorded on a third photographic film. Therefore, it is not always possible to correctly superpose the X-ray images recorded on the two X-ray photographic films one upon the other and remove images other than the structure to be diagnosed, and it is very troublesome to match the positions of the X-ray photographic films to each other. Accordingly, the aforesaid subtraction processing method using the X-ray photographic films is not always effective for diagnosis, and has not been used widely, except for a particular use.

Recently, the so-called digital subtraction processing method or digital radiography (hereinafter referred to as "DR") has attracted attention since, if the image data is a digital value, subtraction can be conducted by a linear computer processing without using the troublesome, non-linear photographic subtraction technique. As the DR, there have heretofore been known digital fluoroscopy wherein the output of an X-ray fluoroscopic camera comprising an image intensifier tube (I.I. tube) and a television camera is digitally processed, and scanned projection radiography utilizing the X-ray detecting system of computed tomography, such as Xe detector. The subtraction image obtained by the DR, is practically advantageous over the subtraction image obtained by use of the conventional X-ray photographic films in that subtraction can be electrically conducted by digital processing. However, the DR presents a problem that the spatial resolution of the subtraction image obtained by use of the DR generally depends on the resolution of the X-ray image detector such as I.I. tube, Xe detector, or the like, and that the spatial resolution of the subtraction image becomes lower than that obtained by the conventional method using the X-ray photographic films, making it impossible to sufficiently accurately diagnose a specific structure. Further, since the recording range in the DR is limited by the light receiving area of the X-ray image detector such as I.I. tube, Xe detector, or the like, the DR presents another problem that it is impossible to obtain a subtraction image of a wide range of portion of the human body at one time.

Also in the aforesaid radiation image system using a stimulable phosphor sheet, it is possible to conduct various digital processings since a final radiation image can be reproduced on various output devices after reading out a ratiation image once stored in the stimulable phosphor sheet by use of stimulating rays, detecting the light emitted from the stimulable phosphor sheet upon stimulation thereof by a photodetector, converting the thus detected electric signal into a digital signal, and processing the signal in various ways. Namely, if said radiation image system is utilized for the subtraction processing, it is possible to obtain the advantage of the aforesaid DR, i.e. the advantage that it is possible to conduct a digital processing. Further, said radiation image system can provide an image having markedly higher spatial resolution compared with the conventional DR since it is possible to decrease the beam diameter of the stimulating rays (laser beam) employed for scanning the stimulable phosphor sheet, increase the number of picture elements per unit area, and directly record the final output of the image data obtained by the subtraction processing and various image processings on a light-sensitive material such as silver halide photographic material. Therefore, theoretically, it is possible to obtain a sharp subtraction image having a spatial resolution higher than visual resolution of human eyes. Further, since there is no technical obstruction to make and use the larger size of the stimulable phosphor sheet, it is possible to obtain at one time a subtraction image over a large area covering a wide range of portion of the human body. Thus, the radiation image system using a stimulable phosphor sheet has many important features that the conventional DR does not possess.

However, experiments conducted to obtain a subtraction image in the aforesaid radiation image system using a stimulable phosphor sheet revealed the problems described below.

Namely, when a subtraction image is obtained in the radiation image system using a stimulable phosphor sheet, two stimulable phosphor sheets (in some cases, three or more stimulable phosphor sheets) are sequentially or simultaneously inserted into an image recording table, radiation images to be subtraction processed are recorded on the stimulable phosphor sheets, the stimulable phosphor sheets carrying the radiation images stored therein are then inserted one by one into an image read-out apparatus, and the radiation images to be subtraction processed are read out from the stimulable phosphor sheets. During this course, even when the recording and the read-out are conducted very carefully, a shift and a rotation occur between the images to be subtraction processed. As a result, an image to be erased in the subtraction processing is not erased, or an image to be extracted is erased to develop an artifact. In this case, therefore, a correct subtraction image cannot be obtained, and a very real problem is presented with respect to diagnosis.

In the radiation image system using a stimulable phosphor sheet, a radiation image is stored as a latent image in the stimulable phosphor sheet. Therefore, when a deviation occurs between the radiation images stored in the stimulable phosphor sheets, the two X-ray images cannot be visually matched to each other, and it is not always possible to correct the deviation, unlike the X-ray photographic films on which X-ray images are recorded as visible images.

Further, even when the shift and the rotation between the two radiation images can be detected by use of some means, much time is required for the conventional operation processing to be conducted to correct the detected data of the radiation images, particularly in the case of correction of the rotation. This is a very real problem in practical use.

To solve the above problem, it has been proposed in Japanese Patent Application No. 57(1982)-45473 U.S. Ser. No. 477,571 to employ a subtraction processing method for radiation images comprising the steps of (i) when each radiation image to be subtraction processed is recorded on each stimulable phosphor sheet, simultaneously recording a marker for providing a reference point or a reference line to said stimulable phosphor sheet, (ii) detecting the spatial coordinate of said reference point or said reference line from the digital image signals of said image detected from said stimulable phosphor sheet, (iii) conducting the aforesaid steps for two or more radiation images to be subtraction processed, (iv) calculating a rotation and a shift among said two or more radiation images based on the detected spatial coordinates, (v) digitally rotating and/or moving either one of said radiation images to be subtraction processed based on the calculated rotation and the calculated shift, and then conducting a subtraction processing of the image signals among the corresponding picture elements of said two or more radiation images. The term "shift" as used herein means a longitudinal deviation or a transverse deviation of the radiation image or an object with respect to the stimulable phosphor sheet.

The aforesaid subtraction processing method can automatically correct a shift and/or a rotation occurring among the radiation images stored in the stimulable phosphor sheets. Accordingly, this method can provide a subtraction image which exhibits high contrast resolution and high spatial resolution and which is free of any artifact and very suitable for viewing, particularly for diagnostic purposes.

Further, when combined with the approximate rotation operation as described in Japanese Patent Application No. 57(1982)-45473 U.S. Ser. No. 477,571, the aforesaid subtraction processing method can correct a deviation in position very quickly compared with the conventional operation processing method.

However, in an image forming system using the stimulable phosphor sheet wherein very large amounts of image signals, for example $10^6$ to $10^7$ picture elements, are processed, it takes much time (several minutes to several tens of minutes) even for a large computer to conduct the operation for correcting a deviation in position among the radiation images to be subtraction processed by use of the aforesaid subtraction processing method even if the approximate rotation operation is employed in combination. Even when a special operation processing unit for correcting a deviation in position is employed, it takes one to three minutes for the operation processing unit to conduct operation.

The aforesaid method is practicable only when a large computer or a special-purpose operation processing unit exhibiting high operation speeds. In order to obtain a subtraction image by this method, it is necessary to use a very expensive large computer or a special-purpose operation processing unit having a limited operation function and low flexibility in application. Further, even when such a large computer or a special-purpose operation processing unit is used, it takes a period of one minutes or more for the operation to be conducted.

SUMMARY OF THE INVENTION

The primary object of the present invention is to provide a subtraction processing method for radiation images, which provides a subtraction image without using a digital rotation operation conducted by a large computer or a specialpurpose operation processing unit.

Another object of the present invention is to provide a subtraction processing method for radiation images, which very quickly provides a subtraction image of high image quality.

The specific object of the present invention is to provide an apparatus for carrying out the method.

The above objects of the present invention are accomplished by a subtraction processing method for radiation images including the steps of recording two or more radiation images on separate stimulable phosphor sheets, at least a part of the image information being different among said radiation images, scanning the respective stimulable phosphor sheets with stimulating rays to sequentially release the radiation energy stored in the stimulable phosphor sheets as light emission, photoelectrically detecting the emitted light by a light detecting means to obtain digital image signals of the respective radiation images, and extracting an image of a specific structure contained in at least one of said radiation images by conducting a subtraction processing among said digital data, the subtraction processing method for radiation images comprising: (i) when each radiation image to be subtraction processed is recorded on each stimulable phosphor sheet, simultaneously recording a marker having a shape defining at least one edge portion of the radiation image area in a position fixed with respect to said radiation image, and (ii) reading out image signals of said radiation image by using the detected signal of said edge portion defined by said marker as the synchronizing signal.

In the present invention, deviations in position can be corrected very quickly (the time required for the operation for correcting deviations in position is substantially zero) without digitally conducting the operation for correcting deviations in position by use of a computer or an operation processing unit.

Further, in the present invention, when there is no rotation of the radiation image with respect to the stimulable phosphor sheet, the image read out as described above is not distorted. When there is a rotation, the image read out as described above is distorted. However, it has been found that the rotation occurring in the aforesaid radiation image recording and reproducing system is 2° or less. For such a small angle of rotation, the image distortion is not detrimental to viewing, and it is possible to obtain a subtraction image suitable for viewing particularly for diagnostic purposes.

The subtraction processing method in accordance with the present invention embraces the aforesaid temporal (time difference) subtraction processing, the energy subtraction processing, and a combination of these processings.

In the present invention, in order to improve the signal-to-noise ratio, it is preferable that the stimulable phosphor emit light having a wavelength range not overlapping the wavelength range of the stimulating ray employed to excite the stimulable phosphor. Preferably, when a laser source which emits a stimulating ray having a wavelength within the range between 600 nm and 700 nm, such as a He-Ne laser, is used, a stimulable phosphor which emits light having a wavelength within the range between 300 nm and 500 nm should be selected, as disclosed in U.S. Pat. No. 4,258,264.

Further, in order to increase the amount of light read out from the stimulable phosphor and shorten the read-out time, it is preferable to use a gas ion laser source emitting a laser beam having a wavelength range shorter than 600 nm, such as an $Ar^+$ laser beam (488 nm, 514.5 nm), a $Kr^+$ laser beam (520.9 nm, 530.9 nm, 568.2 nm), or an $Ar^+$-$Kr^+$ laser beam.

As the stimulable phosphor, for example, rare earth activated alkaline earth metal fluorohalide phosphor is preferred. One example of this phosphor is, as shown in DE-OS No. 2,928,245, a phosphor represented by the formula $(Ba_{1-x-y},Mg_x,Ca_y)FX:aEu^{2+}$ wherein X is at least one of Cl and Br, x and y are numbers satisfying $0 < x+y \leq 0.6$ and $xy \neq 0$, and a is a number satisfying $10^{-6} \leq a \leq 5 \times 10^{-2}$. Another example of this phosphor is, as shown in U.S. Pat. No. 4,239,968, a phosphor represented by the formula $(Ba_{1-x},M^{II}_x)FX:yA$ wherein $M^{II}$ is at least one of Mg, Ca, Sr, Zn and Cd, X is at least one of Cl, Br and I, A is at least one of Eu, Tb, Ce, Tm, Dy, Pr, Ho, Nd, Yb and Er, x is a number satisfying $0 \leq x \leq 0.6$, and y is a number satisfying $0 \leq y \leq 0.2$. Further, as the stimulable phosphor to be used in this invention can be used ZnS : Cu,Pb; $BaQ.xAl_2O_3$:Eu wherein $0.8 \leq x \leq 10$; and $M^{II}O.xSiO_2$:A wherein $M^{II}$ is Mg, Ca, Sr, Zn, Cd or Ba, A is Ce, Tb, Eu, Tm, Pb, Tl, Bi or Mn, and x is number satisfying $0.5 \leq x \leq 2.5$, as shown in U.S. Pat. No. 4,236,078. Furthermore, as the stimulable phosphor can be used LnOX : xA wherein Ln is at least one of La, Y, Gd and Lu, X is at least one of Cl and Br, A is at least one of Ce and Tb, x is a number satisfying $0 < x < 0.1$, as shown in U.S. Pat. No. 4,236,078. Among the above enumerated phosphors, the rare earth activated alkaline earth metal fluorohalide phosphor is the most preferable, among which barium fluorohalides are the most preferable in view of the high intensity of emission of light.

Further, barium fluorohalide phosphors added with a metal fluoride as disclosed in Japanese Unexamined Patent Publication Nos. 56(1981)-2385 and 56(1981)-2386, or barium fluorohalide phosphors containing at least one of a metal chloride, a metal bromide and a metal iodide as disclosed in European Patent Publication No. 29,963 are also preferable because of their improved light emitting characteristics.

It is also desirable to color the phosphor layer of the stimulable phosphor sheet made of the above phosphor by use of pigments or dyes to improve the sharpness of the image obtained thereby as disclosed in European Patent Publication No. 21,174.

As for the signal processing, it is possible to employ a frequency processing as disclosed in U.S. Pat. No. 4,315,318 or European Patent Publication No. 31,952, and a gradation processing as disclosed in U.S. Pat. No. 4,302,672, 4,276,473 or 4,310,886

DESCRIPTION OF THE PREFERRED EMBODIMENTS

The present invention will hereinbelow be described in further detail with reference to the accompanying drawings.

Figure 1:
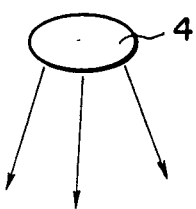
FIG. 1 is a schematic view showing an example of recording of a marker on a stimulable phosphor sheet.

Referring to FIG. 1 showing an example of recording of a marker on a stimulable phosphor sheet, a frame-like marker forming member 2 made of a radiation shielding substance is secured to a predetermined portion on an image recording table 1. At the radiation image recording step, X-rays are emitted from an X-ray source 4 positioned above the image recording table 1, and a marker 2' is recorded together with an image 3' of an object 3 on a stimulable phosphor sheet 5 positioned under the image recording table 1.

Since the marker forming member 2 and the object 3 both secured to the image recording table 1 are recorded on the stimulable phosphor sheet 5 as the marker 2' and the object image 3', the relationship between the positions of the marker 2' and the object image 3' recorded on the stimulable phosphor sheet 5 does not change even when the recording is repeated by sequentially exchanging the stimulable phosphor sheet 5 with a new stimulable phosphor sheet to conduct a subtraction processing.

Accordingly, when separate stimulable phosphor sheets are sequentially or simultaneously inserted into the image recording table 1 to record different radiation images of the same object 3 on the stimulable phosphor sheets for the purpose of obtaining a subtraction image, the relationship between the positions of the marker 2' and the object image 3' does not change even if the relative position of the object image 3' deviates with respect to the stimulable phosphor sheet 5 and even if the relative position of stimulating rays used in the read-out step deviates with respect to the object image 3'.

Accordingly, by using the marker having the shape defining the edge portions of the radiation image area as shown in FIG. 1, and reading out the image signal of the radiation image by using the detected signal of the edge portions of the radiation image area defined by the marker as the synchronizing signal, the deviations between the radiation images stored in the stimulable phosphor sheets are eliminated. Accordingly, it is possible to obtain a subtraction image of high quality by conducting the subtraction processing between the digital image signal of the radiation images thus read out.

The radiation image stored in the stimulable phosphor sheet 5 as shown in FIG. 1 is then read out as described below.

Figure 2:
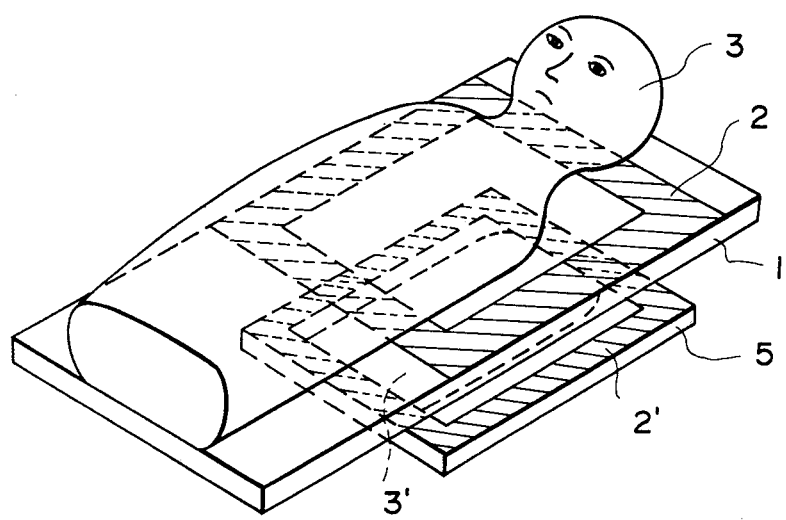
FIG. 2 is a schematic view showing an embodiment of the radiation image read-out apparatus for carrying out the method in accordance with the present invention.
Figure 2:
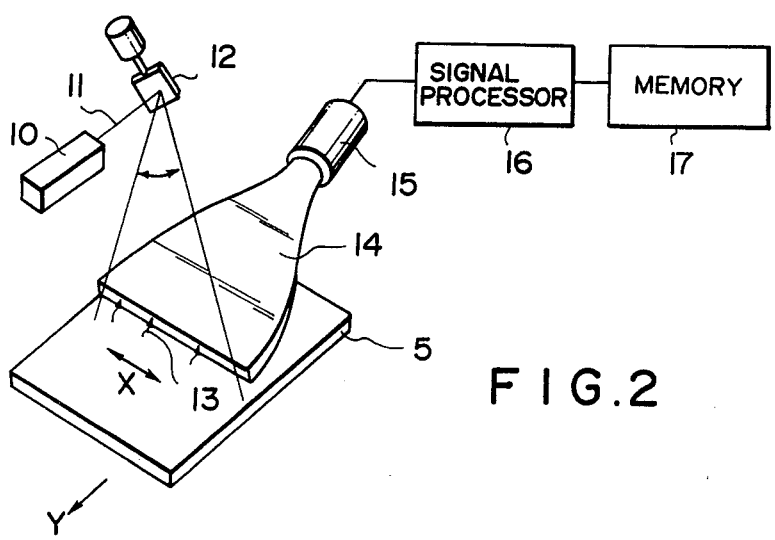

In FIG. 2 schematically showing an embodiment of the read-out apparatus employed in the present invention, a laser beam 11 emitted from a laser source 10 is one-dimensionally deflected in the direction of the arrow X by a light deflector 12 such as galvanometer mirror and directed onto the stimulable phosphor sheet 5. While the laser beam 11 impinges upon the stimulable phosphor sheet 5, the stimulable phosphor sheet 5 is moved in the direction of the arrow Y (sub-scanning direction) and, consequently the whole area of the stimulable phosphor sheet 5 is exposed to and scanned with the laser beam 11. The laser source 10 is selected so that the wavelength distribution of the stimulating rays does not overlap the wavelength distribution of the light emitted from the stimulable phosphor. When exposed to the laser beam 11, the stimulable phosphor sheet 5 emits light in proportion to the X-ray energy stored therein, and the emitted light enters a light guiding sheet 14. The light guiding sheet 14 has a linear light input face positioned close to the scanning line on the stimulable phosphor sheet 5, and a ring-shaped light output face in close contact with the light receiving face of a photodetector 15, which may be a photomultiplier. The light guiding sheet 14 is formed of a transparent thermoplastic resin sheet such as an acrylic resin sheet so that the light entering from the light input face can be transmitted to the light output face by total reflection through the interior of the light guiding sheet 14. The light emitted from the stimulable phosphor sheet 5 upon stimulation thereof is quided in the interior of the light guiding sheet 14, emitted from the light output face of the light guiding sheet 14 and received by the photodetector 15. The light guiding sheet 14 may be of a shape and a material as disclosed in U.S. patent application Ser. No. 105,240 (DE-OS No. 2,951,501) or European Patent Publication No. 32,521.

The light receiving face of the photodetector 15 is provided with a filter for transmitting only the light having the wavelength distribution of the light emitted from the stimulable phosphor sheet 5 and cutting off the light having the wavelength distribution of the stimulating rays, so that the photodetector 15 can detect only the light emitted from the stimulable phosphor sheet 5 upon stimulation thereof. The output of the photodetector 15 is sent to a memory 17 via a signal processor 16 comprising an emplifier, an A/D converter or the like.

Figure 3A:
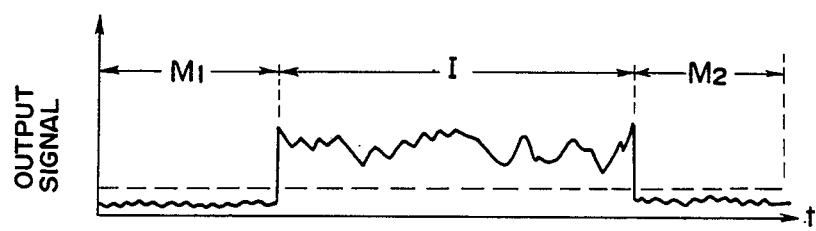
FIGS. 3A and 3B are graphs showing the waveform of the output signal obtained in the apparatus shown in FIG. 2, and the differentiated signal obtained from the output signal, respectively.

As shown in FIG. 3A, the output signal obtained from the photodetector 15 represents noise below a certain level (indicated by the broken line) as long as the portion where the marker exists is scanned with the laser beam 11 (i.e. during the periods indicated by Ml and M2 in FIG. 3A), and represents a signal above said certain level corresponding to the radiation image when the portion where the radiation image exists is scanned with the laser beam 11 (i.e. during the period indicated by I in FIG. 3A).

Accordingly, by detecting the edge portions of the radiation image area defined by the marker, for example, by detecting the aforesaid signal level, and using the detected signal thus obtained as the synchronizing signal, it is possible to obtain a radiation image corrected for deviations.

By way of example, a method of correcting the deviations of the radiation images by use of the aforesaid detected signal of the edge portion of the radiation image area will now be described below.

Figure 4:
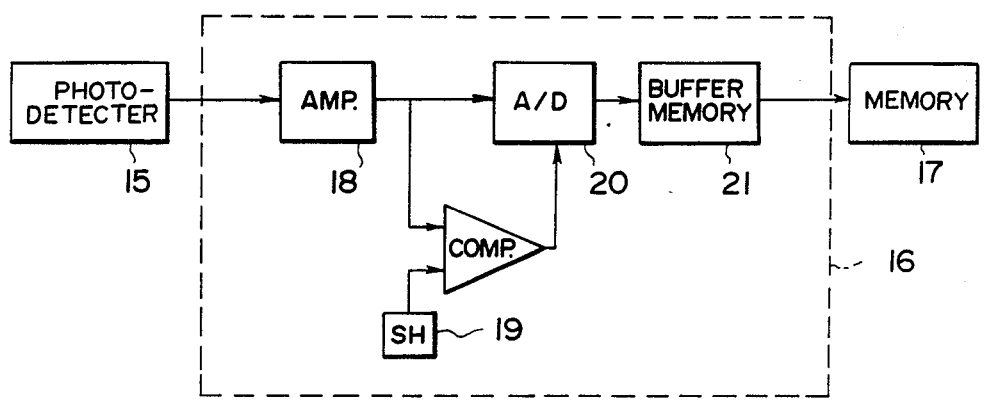
FIG. 4 is a block diagram showing an embodiment of the signal processing circuit employed in the apparatus shown in FIG. 2, FIGS. 5A and 5B are explanatory views showing the correction of deviation in position conducted in accordance with the present invention.

FIG. 4 is a block diagram showing an embodiment of the signal processor 16 shown in FIG. 2.

Figure 5A:
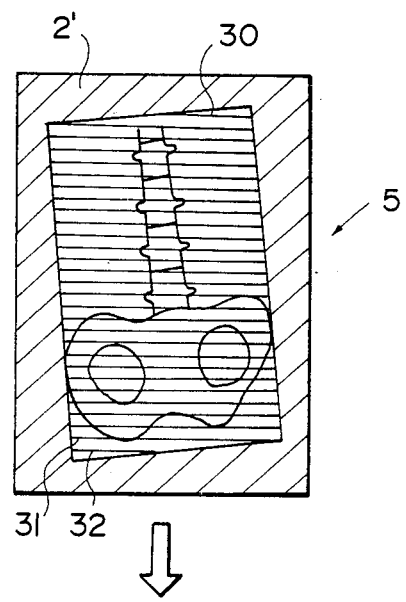
Figure 5B:
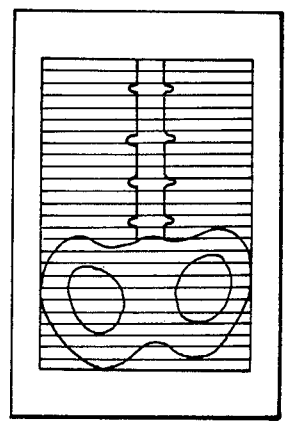

In the signal processor 16, the output signal obtained from the photodetector 15 is amplified by an amplifier 18. When a comparator detects that the amplified output signal rises above a predetermined signal level which is higher than the noise level generated by a threshold generating circuit 19, i.e. when the edge portion of the radiation image area is detected, the output signal is A/D converted by an A/D converter 20 until the output signal falls below the predetermined level, i.e. until another edge portion of the radiation image area is detected. The digital image signal of the picture elements scanned by one scanning line is obtained in this manner and once stored in a buffer memory 21. When the image signals of a predetermined number of picture elements are stored in the buffer memory 21, the image signals are transmitted to the memory unit 17. When the number of the picture element does not reach the predetermined number, the image signals of said picture elements stored in the buffer memory are cancelled. For example, in case the marker 2' is stored in the stimulable phosphor sheet 405 in the condition rotated with respect to the stimulable phosphor sheet 405 as shown in FIG. 5A, the effective image scanning distance of the scanning line, i.e. the locus of the stimulating rays (which scan the stimulable phosphor sheet 5) in parallel with the upper edge thereof becomes shorter at the upper portion and the lower portion of the region wherein the radiation image is recorded than other portion thereof. Accordingly, the number of the picture elements scanned when these upper and lower portions are scanned with the stimulating rays becomes smaller than a number of the picture elements predetermined corresponding to the width inside of the marker 2. In this case, therefore, all of the signals obtained from these upper and lower portions are cancelled. The image signals which have not been cancelled are stored in the memory as if they represented the image as shown in FIG. 5B. When the image signals are processed as described above, even a radiation image involving shift and/or a rotation (as shown in FIG. 5A) can be stored in the memory or the like as the radiation image wherein the shift and the rotation are eliminated (as shown in FIG. 5B), and can then be reproduced as a visible image or subjected to various image processings and reproduced as a visible image. In FIG. 5B, the image is distorted to an extent corresponding to the degree of rotation of the marker 2' with respect to the stimulable phosphor sheet 5. However, it has been found that, when the rotation is 2° or less, the image distortion is not detrimental to viewing.

Figure 6:
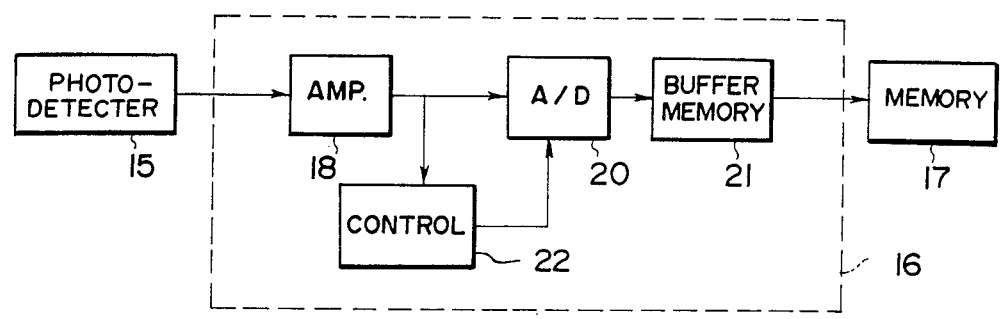
FIG. 6 is a block diagram showing another embodiment of the signal processing circuit employed in the apparatus shown in FIG. 2, FIGS. 7A, 7B and 7C are schematic views showing further embodiments of the marker employed in the present invention.

FIG. 6 is a block diagram showing another embodiment of the signal processor 16.

Figure 3B:
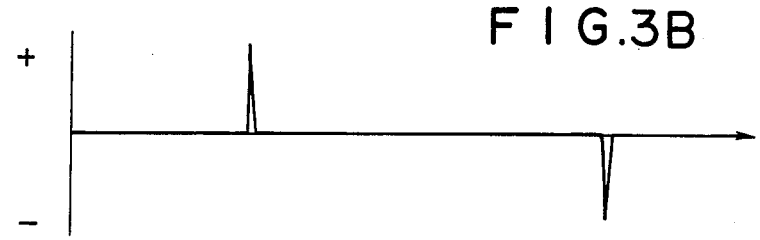

In the signal processor 16, the output signal obtained from the amplifier 18 is sent to a control circuit 22, which converts the output signal into a rectangular waveform signal and differentiates the rectangular waveform signal as shown in FIG. 3B. The output signal obtained during the period between the "+" peak and the "−" peak representing the edge portions of the radiation image area is A/D converted by the A/D converter 20. The digital image signals of the picture elements scanned by one scanning line is obtained in this manner and once stored in the buffer memory 21. Only when the image signals of a predetermined number of picture elements are stored in the buffer memory 21, the image signals are transmitted to the memory unit 17. In this manner, deviations of the radiation image are corrected.

Figure 7A:
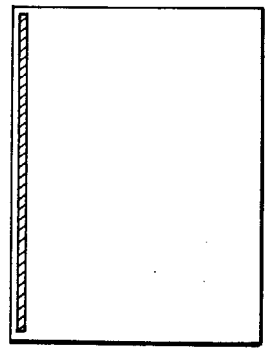
Figure 7B:
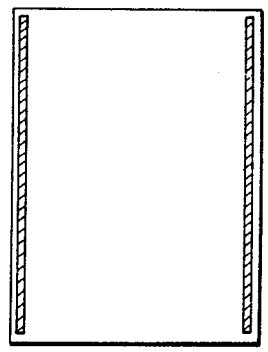

It is also possible to employ one or two rectangular markers as shown in FIG. 7A and 7B, detect the edge portion or portions of the radiation image area from the marker or markers, and use the thus obtained detected signal as the synchronizing signal.

When one rectangular marker is employed, the edge portion of the radiation image area can be detected by detecting the output signal having a level below the predetermined level for a predetermined period or by obtaining the differentiation signal as described above. When two rectangular markers are employed, the scanning can be stopped by detecting the second marker.

In case the image signals is once stored in the buffer memory, the image signals corrected for deviations can be read out from the buffer memory even when only the second marker (i.e. the marker scanned after the image are is scanned) is used.

Figure 7C:
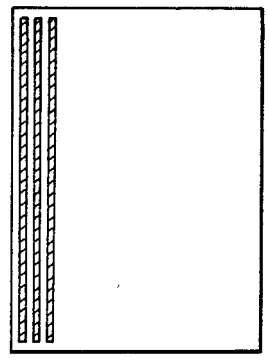

Further, it is also possible to employ a marker comprising two or more lines having a predetermined width and positioned in parallel with one another at predetermined intervals, as shown in FIG. 7C. In this case, when the marker is scanned with stimulating rays, the output signal obtained becomes higher than and lower than the aforesaid level at every intervals predetermined. Therefore, the marker can be detected certainly.

Storing the image signals in the buffer memory need not be started immediately after the marker is detected. It may be started after a predetermined period has elapsed after the marker is detected.

After one of the radiation images to be subtraction processed is read out as described above, read-out of the other radiation image is conducted in the same manner.

After the two radiation images to be subtraction processed are read out as described above, a subtraction processed image having high quality can be obtained simply by conducting the subtraction processing of the image signals of the radiation images to be subtraction processed between the corresponding addresses in the memory where the image signals are stored. It should be understood that the subtraction may be carried out according to the formula shown below, thereby to change the linear gradation and raise or lower the density level of the whole image. However, the operation should preferably be carried out after the log-arithmetic conversion of the image signal of the light emitted from the stimulable phosphor. This is because band compression of the original image signal value is thereby achieved, and complete removal of unnecessary image information becomes possible.

$$Ssub = as1 - bs2 + c$$

wherein Ssub designates the subtraction image signal value, sl and s2 designate the image signal value of the radiation images to be subtraction processed, c is the constant, and a and b are the constants (a=b in the temporal (time difference) subtraction, or a and b are coefficients determined according to the absorption factor of the structure to be extracted in the energy subtraction).

By subjecting the subtraction image obtained as described above to various signal processings such as processing of frequency response, gradation processing, arithmetic averaging processing, image size reduction processing and image size enlargement processing, it is possible to obtain a subtraction image having high contrast resolution and high spatial resolution and suitable for viewing, particularly diagnostic purposes. The aforesaid various signal processings may be conducted for the radiation images before the subtraction processing.

The subtraction image obtained as described above is reproduced as a visible image on a recording material such as photographic light-sensitive material, or on a CRT.

While the embodiments of the present invention have been described above for the cases wherein the subtraction image is obtained from two radiation images, a subtraction image can similarly be obtained also from three or more radiation images in accordance with the present invention.

The present invention has been described above with reference to the cases wherein a radiation image is recorded in a stimulable phosphor sheet. However, also when images recorded on X-ray photographic films are optically read out by use of light transmitting through or reflected from the X-ray photographic films, the present invention can be applied in the same manner as described above.

We claim:

1. A subtraction processing method for radiation images including the steps of recording two or more radiation images on separate stimulable phosphor sheets, at least a part of image information being different among said radiation images, scanning the respective stimulable phosphor sheets with stimulating rays to sequentially release the radiation energy stored in the stimulable phosphor sheets as light emission, photoelectrically detecting the emitted light by a light detecting means to obtain digital image signals of the respective radiation images, and extracting an image of a specific structure contained in at least one of said radiation images by conducting a subtraction processing among said digital image signal, the subtraction processing method for radiation images comprising:
   (i) when each radiation image to be subtraction processed is recorded on each stimulable phosphor sheet, simultaneously recording a marker having a shape defining at least one edge portion of the radiation image area in a position fixed with respect to said radiation image, and
   (ii) reading out image signals of said radiation image by using the detected signal of said edge portion defined by said marker as the synchronizing signal.

2. A method as defined in claim 1 wherein said marker has a frame-like shape.

3. A method as defined in claim 1 wherein said marker has a rectangular shape.

4. A method as defined in claim 1 wherein said marker comprises two or more lines having a predetermined width and positioned in parallel with one another at predetermined intervals.

5. A subtraction processing apparatus comprising:
   (i) a means for scanning two or more stimulable phosphor sheets carrying radiation images, wherein at least a part of the image information is different among said radiation images, and markers stored therein with stimulating rays, said markers having a shape defining at least one edge portion of the radiation image area in a position fixed with respect to said radiation images,
   (ii) a means for detecting and photoelectrically converting the light emitted from said stimulable phosphor sheets when said stimulable phosphor sheets are scanned with stimulating rays,
   (iii) a means for synchronizing the read-out of image signals of said radiation image by using the detected signal of said edge portion defined by said marker,
   (iv) a means for converting the electric signals obtained by scanning said stimulable phosphor sheets with stimulating rays into digital signals, and
   (v) a means for digitally conducting a subtraction processing among said radiation images stored in said two or more stimulable phosphor sheets and obtaining a signal for forming an image of a specific structure contained in at least one of said radiation images.

6. An apparatus as defined in claim 5 wherein said marker has a frame-like shape.

7. An apparatus as defined in claim 5 wherein said marker has a rectangular shape.

8. An apparatus as defined in claim 5 wherein said marker comprises two or more lines having a predetermined width and positioned in parallel with one another at predetermined intervals.

9. An apparatus as defined in any of claims 5 to 8 wherein said means for synchronizing the read-out of image signals of said radiation image comprises a threshold generating means and a comparing means for comparing the level of the output signal of said detecting and photoelectric converting means with the threshold value generated by said threshold generating means.

10. An apparatus as defined in any of claims 5 to 8 wherein said means for synchronizing the read-out of image signals of said radiation image comprises a control means for converting the output signal of said detecting and photoelectric converting means into a rectangular waveform and differentiating the rectangular waveform signal.

* * * * *